United States Patent
Fong

(10) Patent No.: US 8,244,711 B2
(45) Date of Patent: Aug. 14, 2012

(54) SYSTEM, METHOD AND APPARATUS FOR INFORMATION RETRIEVAL AND DATA REPRESENTATION

(76) Inventor: Chin Lung Fong, Stanford, CA (US)

(*) Notice: Subject to any disclaimer, the term of this patent is extended or adjusted under 35 U.S.C. 154(b) by 313 days.

(21) Appl. No.: 12/568,537

(22) Filed: Sep. 28, 2009

(65) Prior Publication Data

US 2011/0078148 A1    Mar. 31, 2011

(51) Int. Cl.
*G06F 17/30* (2006.01)
(52) U.S. Cl. ........ 707/711; 707/741; 707/759; 707/769; 707/E17.014; 707/E17.051; 707/E17.069; 707/E17.108
(58) Field of Classification Search .......... 707/711, 707/741, 759, E17.051, E17.069
See application file for complete search history.

(56) References Cited

U.S. PATENT DOCUMENTS

| | | | |
|---|---|---|---|
| 6,510,406 B1 | 1/2003 | Marchisio | |
| 6,560,600 B1 * | 5/2003 | Broder | 1/1 |
| 6,633,868 B1 | 10/2003 | Min et al. | |
| 7,051,017 B2 | 5/2006 | Marchisio | |
| 7,734,627 B1 * | 6/2010 | Tong | 707/737 |
| 2005/0165757 A1 * | 7/2005 | Broder | 707/3 |
| 2008/0275902 A1 * | 11/2008 | Burges et al. | 707/102 |
| 2010/0268711 A1 * | 10/2010 | Liao et al. | 707/736 |

FOREIGN PATENT DOCUMENTS

| | | |
|---|---|---|
| CN | 101055580 A | 10/2007 |
| CN | 101059806 A | 10/2007 |
| CN | 101075942 A | 11/2007 |
| CN | 101079026 A | 11/2007 |
| WO | WO 2008/069791 A1 | 6/2008 |

OTHER PUBLICATIONS

Li, Using Link-Based Content Analysis to Measure Document Similarity Effectively, APWeb/WAIM 2009, May 4, 2009, pp. 455-467.*
Search Report for Hong Kong Short-Term Patent Application, Entitled "Computer Information Retrieval Using Random Walk on Graph Representation of Keyword Relationship", mailed Aug. 19, 2008, 8 pages (English translation provided).

* cited by examiner

*Primary Examiner* — John E Breene
*Assistant Examiner* — Albert Phillips, III
(74) *Attorney, Agent, or Firm* — Sheridan Ross P.C.

(57) ABSTRACT

A system, method, and apparatus for information retrieval are provided. Embodiments of the present invention may generate data structures that may be used to process user queries. According to embodiments of the present invention, a processor component configured to perform the operations of an indexing module and a storage module, the indexing module configured to generate a term list and a term-file matrix from information stored on the storage module, the indexing module further configured to generate an adjacency matrix from the one or more files, wherein the adjacency matrix represents a relationship of the one or more terms in each of the one or more files; and the indexing module further configured to generate a probability matrix using the adjacency matrix and a one-step or two-step random walk.

21 Claims, 7 Drawing Sheets

SYSTEM, METHOD AND APPARATUS FOR INFORMATION RETRIEVAL AND DATA REPRESENTATION

BACKGROUND OF THE INVENTION

The present invention relates generally to information retrieval, and more particularly to a system, method, and apparatus for information retrieval using data objects.

Due to the widespread use of computers and computer technology, it has become necessary to search large amounts of information for the information that is relevant to a particular computer user. For example, a user often needs to search large databases, their personal computer files, or the information from the Internet, which may be stored on multiple databases. Many information retrieval methods fail to provide sufficient quality in the results. For example, large databases of documents such as the Internet contain many low quality documents or irrelevant documents. As a result, a search can return hundreds of irrelevant or useless documents. In order to improve the quality of the results, additional search terms or a review of many search results is required.

Existing search engines use a variety of techniques that attempt to present the most relevant documents to the user. For example, documents can be ranked according to variations of a standard vector space model. These variations could include rankings that depend on how recently a particular piece of information was updated, or how close the search terms are to the beginning of the information source, or how often the information is linked to by other sources of information, such as hyperlinks from other web pages. Although these strategies can provide a selection process, the results still have relatively low quality. These search strategies are also susceptible to "spamming" techniques that can be used to artificially increase the placement in a search result.

A number of other known searching methods are currently known. However, there is still a need for an information retrieval system, method and apparatus that addresses these and other shortcomings of known information retrieval methods.

SUMMARY OF THE INVENTION

According to one embodiment of the invention, an information retrieval system is disclosed. The information retrieval system includes a processor component configured to perform the operations of an indexing module and a storage module, the indexing module configured to generate a term list and a term-file matrix from information stored on the storage module, the information including one or more files, wherein the term-file matrix is a first data representation of the one or more files, the term-file matrix representing the appearance of terms in each of the one or more files, and wherein the term list is a data representation of one or more terms; the indexing module further configured to generate an adjacency matrix from the one or more files, wherein the adjacency matrix is a second data representation of the one or more files, the adjacency matrix representing a relationship of the one or more terms in each of the one or more files; and the indexing module further configured to generate a probability matrix using the adjacency matrix and a random walk, wherein the probability matrix is a data structure representing a value of each one of the one or more terms relative to the remainder of the one or more terms.

According to another embodiment of the invention, an information retrieval method is disclosed. The information retrieval method includes generating a term list and a term-file matrix from information stored on a storage module, the information including one or more files, wherein the term-file matrix is a first data representation of the one or more files, the term-file matrix representing the appearance of terms in each of the one or more files, and wherein the term list is a data representation of one or more terms; generating an adjacency matrix from the one or more files, wherein the adjacency matrix is a second data representation of the one or more files, the adjacency matrix representing a relationship of the one or more terms in each of the one or more files; and generating a probability matrix using the adjacency matrix and a random walk, wherein the probability matrix is a data structure representing a value of each one of the one or more terms relative to the remainder of the one or more terms.

According to yet another embodiment of the present invention, a computer-readable memory medium having computer-executable instructions for controlling a computer processor to retrieve information is disclosed. The computer-readable memory medium includes instructions for generating a term list and a term-file matrix from information stored on a storage module, the information including one or more files, wherein the term-file matrix is a first data representation of the one or more files, the term-file matrix representing the appearance of terms in each of the one or more files, and wherein the term list is a data representation of one or more terms; instructions for generating an adjacency matrix from the one or more files, wherein the adjacency matrix is a second data representation of the one or more files, the adjacency matrix representing a relationship of the one or more terms in each of the one or more files; and instructions for generating a probability matrix using the adjacency matrix and a random walk, wherein the probability matrix is a data structure representing a value of each one of the one or more terms relative to the remainder of the one or more terms.

According to one embodiment of the invention, the indexing module may further be configured to generate an indexed database using the term-file matrix and the probability matrix. Also, the term-file matrix is represented as D, the probability matrix is represented as P, and the indexed database that represents the value of each of the one or more files relative to each of the terms is generated by computing $P^2D$. The adjacency matrix may be represented by A, where $A_{ij}=1$ if a term i and a term j appear in the same one of the one or more files, and $A_{ij}=0$ if term i and term j fail to appear in the one of the one or more files, and $A_{ii}=0$; and where the probability matrix P is computed by:

$$P_{ij} = c\delta_{ij} + (1-c)\frac{A_{ij}}{\sum_{k=1}^{m} A_{kj}}.$$

According to another embodiment, the indexing module may further be configured to generate file data from the one or more files by parsing the one or more files, wherein the term-file matrix and the adjacency matrix are generated using the term data. The parsing of the one or more files may include removing terms from the file data that appear in the one or more files with a frequency greater than a predetermined value.

According to another embodiment, the information retrieval system may further include a query module configured to receive a user query; the query module further configured to generate a query vector based on the user query, wherein the query vector is a data representation of the user query based on terms in the user query; and wherein the query module is further configured to provide a query result to the user based on a value vector, wherein the processor component is further configured to generate the value vector using the term-file matrix, the adjacency matrix, and the probability matrix, wherein the value vector represents the value of each of the one or more files relative to the user query. The file value vector ω may be generated by computing $\pi P^2 D$.

Still other embodiments of the present invention will become readily apparent to those skilled in the art from the following detailed description, wherein embodiments of the invention are described by way of illustration. As will be realized, the invention is capable of other and different embodiments and its several details are capable of modifications in various respects, all without departing from the spirit and the scope of the present invention.

DETAILED DESCRIPTION

In the following description, reference is made to the accompanying drawings where, by way of illustration, specific embodiments of the invention are shown. It is to be understood that other embodiments may be used as structural and other changes may be made without departing from the scope of the present invention. Also, the various embodiments and aspects from each of the various embodiments may be used in any suitable combinations. Accordingly, the drawings and detailed description are to be regarded as illustrative in nature and not as restrictive.

Generally, embodiments of the present invention are directed to a system, method, and apparatus for information retrieval. Embodiments of the present invention generate data structures that may be used to process user queries. In one embodiment, a query module is configured to receive and process user queries. The data structures may be used to assign values to documents or files relative to each of the keywords or terms searchable by the information retrieval system, and then the system generates the values of the documents or files with respect to a particular user query.

Figure 1:
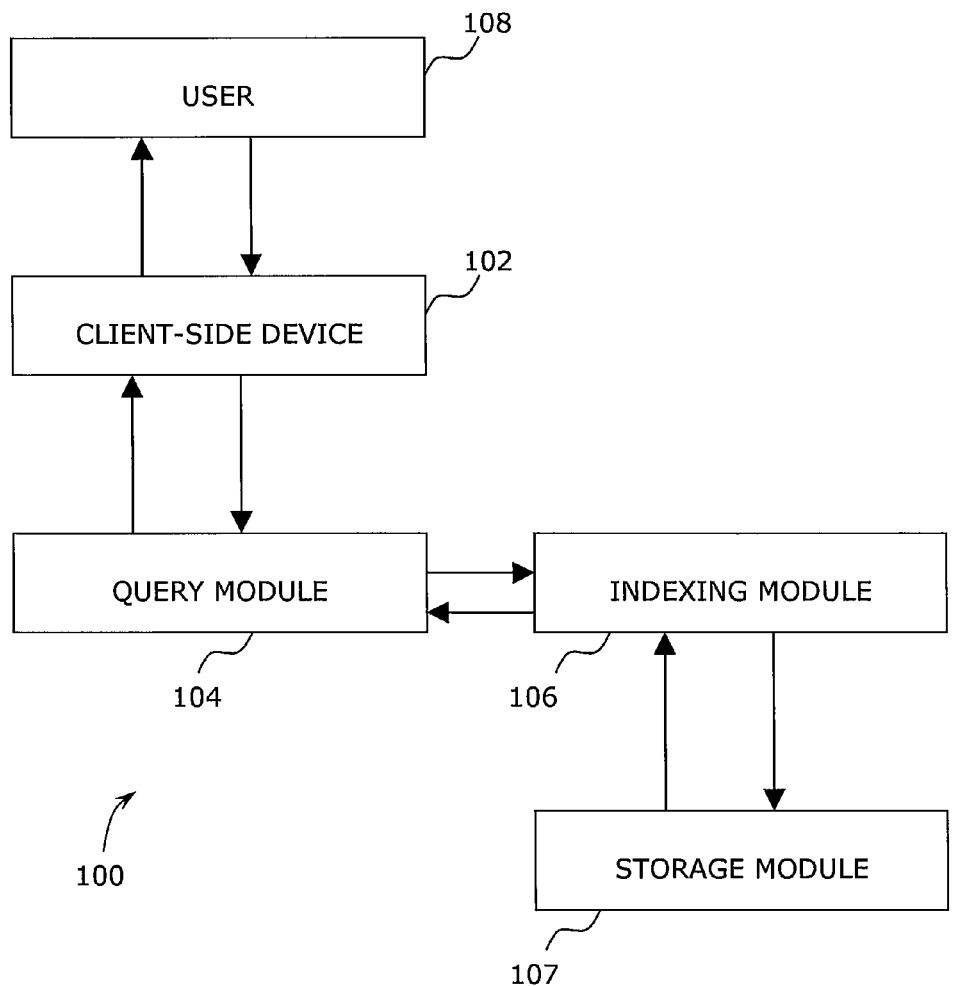
FIG. 1 is a block diagram of an example information retrieval system, in accordance with an embodiment of the present invention.

Referring now to the figures, FIG. 1 is a block diagram of an example information retrieval system 100, in accordance with an embodiment of the present invention. The information retrieval system ("the system") 100 shown includes a client-side device 102, a query module 104, an indexing module 106, and a storage module 107. The client-side device 102 receives input from a user 108, such as in the form of a user query containing one or more search terms, and sends the user query to the query module 104. The query module 104 processes the user query generally in accordance with the process described with reference to FIGS. 5 and 6. The query module 104 processes and retrieves a search result using the indexing module 106. The indexing module 106 is configured to generate, maintain, and/or update one or more data structures and an indexed database generally in accordance with the process described with reference to FIGS. 4 to 6. The query module 104 is further configured to a search result send to the client-side device 102. The client-side device 102 displays the result to the user 108. The storage module 107 includes one or more memories for storing data and/or system operating instructions. The storage module 107, for example, may include memory for storing the data structures, the indexed database and a database management system.

The client-side device 102 is in operable communication with the query module 104, the query module 104 is in operable communication with the indexing module 106, and the indexing module 106 is in operable communication with the storage module 107. In one embodiment, each of the modules and devices may be in operable communication if required by the particular implementation. Operable communication may be any suitable communication method, such as over wired or wireless networks, electrical connections, including direct and indirect coupling. In one embodiment, the client-side device 102 is a computer. However, the client-side device 102 may be any suitable device, such as a mobile device, personal data assistant, personal computer, or other computing device capable of sending information to the system in the appropriate format.

According to one embodiment, the query module 104 and the indexing module 106 may run on a single computer. According to another embodiment, the query module 104 and the indexing module 106 may run on the client-side device 102, such as for implementation of the information retrieval system for a personal computer search. According to yet another embodiment, for larger implementations of the system where queries are received from multiple users, the query module 104 and the indexing module 106 may each run on separate computers. For example, the query module 104 may run on a query server and the indexing module 106 may run on an indexing server. According to another embodiment, multiple query modules 104 and multiple indexing modules 106 operate simultaneously on multiple computer servers. Information on the multiple computer servers may also be mirrors in order to provide functionality on a large scale. Also, while the query module 104 and the indexing module 106 are illustrated as two separate modules, a single module may also perform the function of both the query module 104 and indexing module 106.

Figure 2:
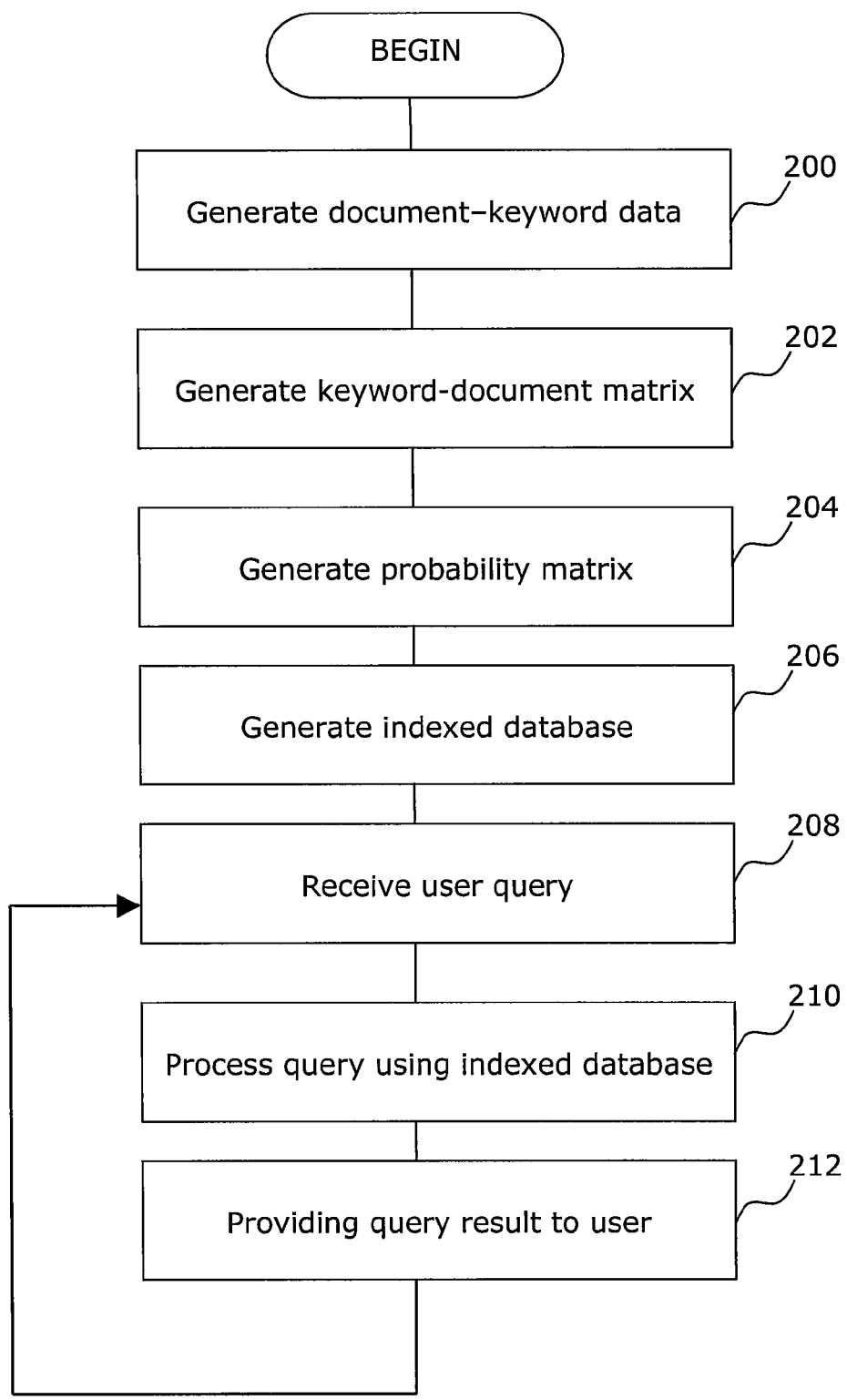
FIG. 2 is a flow diagram showing a first example process of the operation of the information retrieval system, in accordance with an embodiment of the present invention.

FIG. 2 is a flow diagram showing an example process of the operation of the information retrieval system, in accordance with an embodiment of the present invention. An information processor may be configured to run the various modules to carry out the steps and operations of the information retrieval system. Each of the following steps may be performed by the any suitable module or device of the system. In step 200, document-keyword data is generated from multiple information files. The information files may be a collection of documents and information files publicly available on the Internet. The information files may be stored in a database for processing. The documents and information files may include computer-readable data that represents actual documents or electronic files. In step 202, a keyword-document matrix is generated using the document-keyword data. In step 204, a probability matrix is generated. In step 206, an indexed database is generated using the probability matrix. In step 208, the system receives a user query from the user 108. In step 210, the user query is processed using the indexed database. In step 212, the system provides a query result to the user. Steps 208 to 212 may be repeated in response to additional user queries, both from the same user for from other users. According to other embodiments of the present invention, such as that described with reference to FIG. 6, steps 210 and 212 may be performed using the keyword-document matrix and the probability matrix, without necessarily generating the indexed database.

In order to illustrate the operation of embodiments of the present invention, a simplified example of the operation of the system is described. In the simplified example, suppose there is a database of three documents including information as follows:

Document 1: "bottled tasty apple juice";
Document 2: "bottled fresh orange juice"; and
Document 3: "bottled apple cider".

In a first step, the system runs through all of the documents and extracts all of the words as keywords. In the example, we have the following:

Document 1: "bottled", "tasty", "apple", "juice";
Document 2: "bottled", "fresh", "orange", "juice"; and
Document 3: "bottled", "apple", "cider".

After the keyword extraction step, the documents represent document-keyword data.

In another step, the keywords that appear frequently, or in all or most of the documents, will be removed. This step is described mathematically in the general description with reference to FIG. 4. In the example, since the word "bottled" appears in all three documents, it can be removed from the documents. The documents in the database then become:

Document 1: "tasty", "apple", "juice";
Document 2: "fresh", "orange", "juice"; and
Document 3: "apple", "cider".

In another step, the system parses through all of the documents and generates a list of unique keywords. In this step, all the repeated entries are removed. In the example, the unique keyword list is: tasty; apple; juice; fresh; orange; cider.

Figure 3:
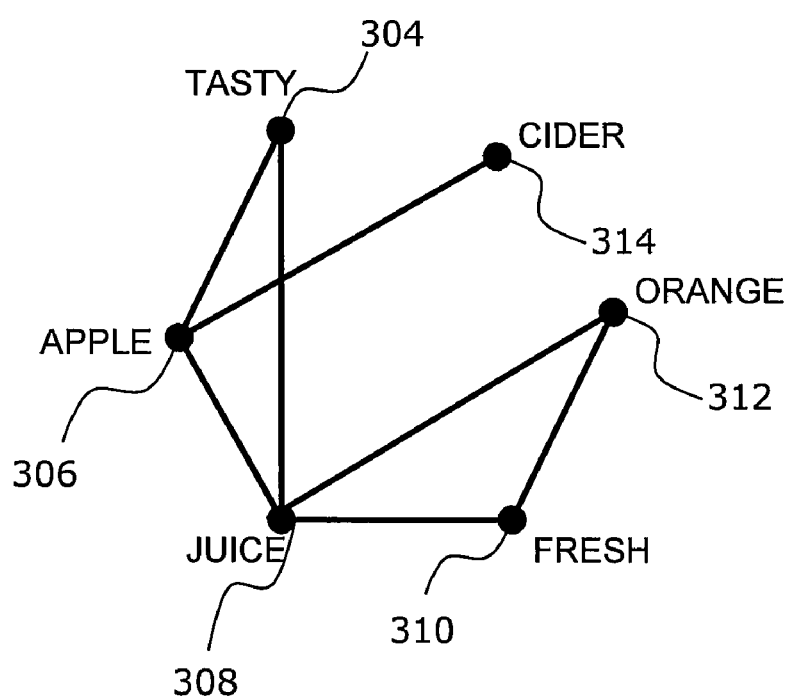
FIG. 3 is an example node diagram illustrating the building of a data structure from a database of documents, in accordance with an embodiment of the present invention.

The system builds a data structure using the list of keywords. FIG. 3 is an example node diagram 300 illustrating the building of the data structure from a database of documents, in accordance with an embodiment of the present invention. The diagram 300 is a graphical representation of the data structure created by the system. In the diagram 300, each keyword is represented by a node. If two keywords appear in the same document, an edge 302 is added between them. For example, "tasty" 304, "apple" 306 and "juice" 308 are keywords from the same document, and therefore, they are represented in the diagram 300 by three interconnected nodes. The same construction principle is performed for the words "fresh" 310, "orange" 312, and "juice" 308 as well as "apple" 306 and "cider" 314. The resulting diagram 300 in FIG. 3 includes 6 nodes and 7 edges representing the database.

Now, a random walk of the diagram 300 is considered. Assume a random walk starting at one of the nodes has a certain probability c of staying at the node and a probability (1−c) of leaving the node. If the random walk leaves the node, the probability of going to any neighborhood node is the same. A "neighborhood", node means that the starting node and the ending node are connected by an edge. Suppose c=0.5. Then the matrix $P_{ij}$ represents the probability of going from node i to node j in one step. Referring to the diagram 300, in the example:

$$P = \begin{pmatrix} 0.5 & 0.25 & 0.25 & 0 & 0 & 0 \\ 0.167 & 0.5 & 0.167 & 0 & 0 & 0.167 \\ 0.125 & 0.125 & 0.125 & 0.125 & 0.125 & 0 \\ 0 & 0 & 0.25 & 0.5 & 0.25 & 0 \\ 0 & 0 & 0.25 & 0.5 & 0.25 & 0 \\ 0.5 & 0 & 0 & 0 & 0 & 0.5 \end{pmatrix}.$$

The i–th row and column represents the i–th word in the keyword list.

Embodiments of the information retrieval system and method use the probability of a two-step random walk. We take $P^2$ as the value of each keyword relative to others in the keyword list. In the example:

$$P^2 = \begin{pmatrix} 0.323 & 0.281 & 0.292 & 0.031 & 0.031 & 0.042 \\ 0.271 & 0.313 & 0.208 & 0.021 & 0.021 & 0.167 \\ 0.146 & 0.156 & 0.365 & 0.156 & 0.156 & 0.021 \\ 0.031 & 0.031 & 0.313 & 0.344 & 0.281 & 0.000 \\ 0.031 & 0.031 & 0.313 & 0.281 & 0.344 & 0.000 \\ 0.500 & 0.125 & 0.125 & 0.000 & 0.000 & 0.250 \end{pmatrix}.$$

Now, suppose the system receives a user search for the phrase "apple juice". The system breaks down the query into two keywords "apple" and "juice". In this example, this user search represents a random starting with equal probability at either "apple" or "juice", which is represented as an initial probability query vector:

π=(0 0.5 0.5 0 0 0)

Then, the probability distribution after a two step random walk will be:

$\pi P^2$=(0.208 0.234 0.286 0.089 0.089 0.094)

This probability distribution represents the value of each keyword with respect to the given user search or search query.

A matrix $\tilde{D}$ is constructed to represent the occurrence of keywords within the document. The rows correspond to the keywords and the columns correspond to the documents. $\tilde{D}_{ij}=1$ means that keyword i appears in document j. In the example:

$$\tilde{D} = \begin{pmatrix} 1 & 0 & 0 \\ 1 & 0 & 1 \\ 1 & 1 & 0 \\ 0 & 1 & 0 \\ 0 & 1 & 0 \\ 0 & 0 & 1 \end{pmatrix}.$$

To normalize the effect that one or more document may contain more keywords than other documents, a normalization may be performed by dividing each column by its respective column sum to obtain D. In the example, $$D = \begin{pmatrix} 0.33 & 0 & 0 \\ 0.33 & 0 & 0.5 \\ 0.33 & 0.33 & 0 \\ 0 & 0.33 & 0 \\ 0 & 0.33 & 0 \\ 0 & 0 & 0.5 \end{pmatrix}.$$

According to one embodiment, the value that the system assigns to each document is the probability that a two-step random walk stops on a keyword contained in a certain document, weighted by the normalized document keyword matrix. In essence, this value is:

$\pi P^2 D = (0.243\ 0.155\ 0.164)$.

Therefore, Document 1 has the highest value relative to the given user query, followed by Document 3 with the second highest value and Document 2 with the third highest value. The result of this example search for "apple juice", in the order of descending relevancy, is:

Document 1: "bottled tasty apple juice";
Document 3: "bottled apple cider"; and
Document 2: "bottled fresh orange juice".

Figure 4:
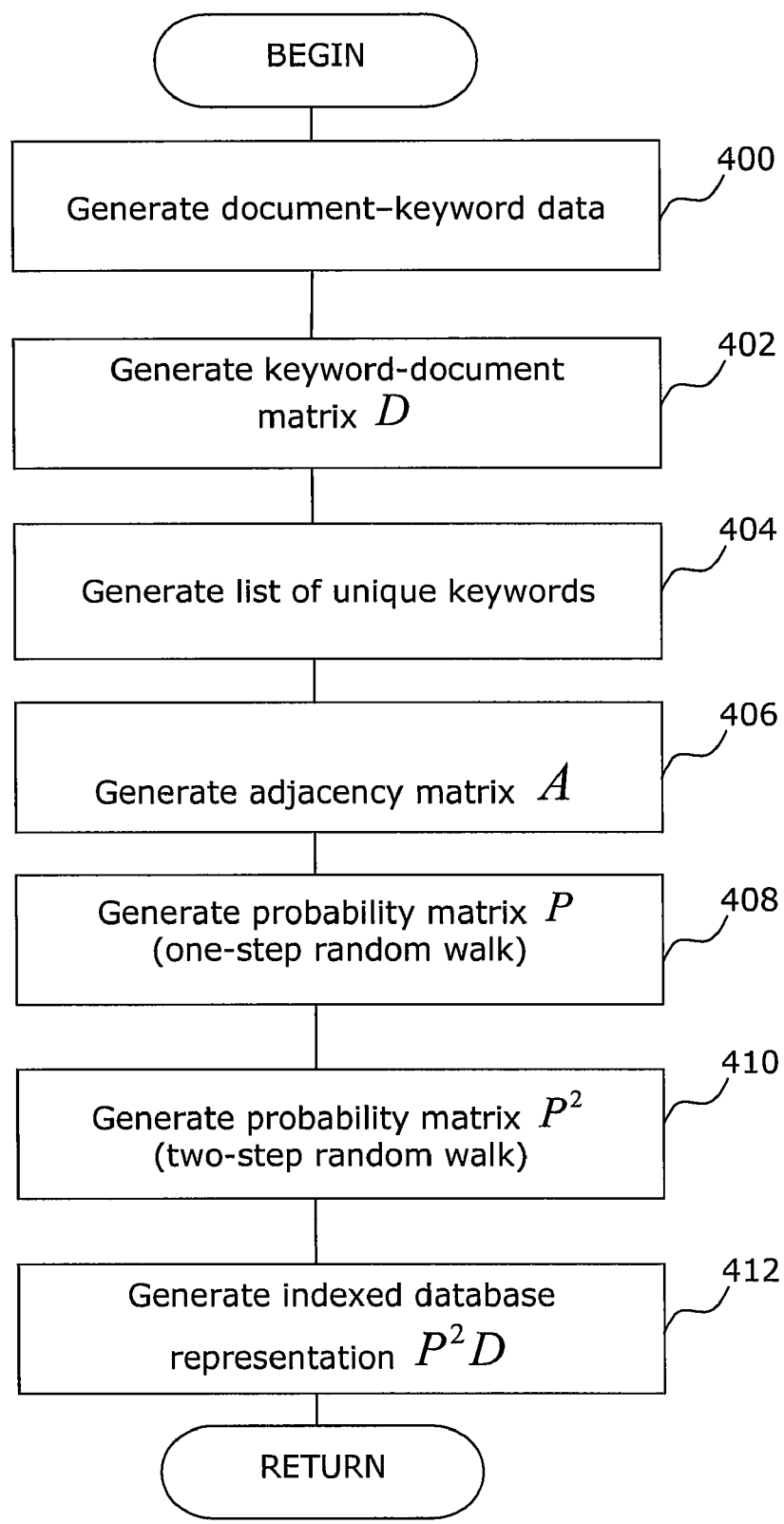
FIG. 4 is a flow diagram showing an example process of generating an indexed database, in accordance with an embodiment of the present invention.

Referring now to a generalized implementation of an example embodiment of the information retrieval system and method, FIG. 4 is a flow diagram showing an example process of generating a keyword-document matrix, an adjacency matrix, a probability matrix, and an indexed database, in accordance with an embodiment of the present invention. Given a set of n documents, suppose the documents contain a total of $\tilde{m}$ distinct words. In step 400, the system generates document-keyword data from a collection of raw data. The raw data may take any form. However, for the purpose of illustration, the raw data is generally a database of documents having text contents. To generate the document-keyword data, the system performs keyword extraction, extracting the keywords from each document. As part of the keyword extraction, the system may create a list of the distinct words and remove all the words from the list that appear too frequently, thereby keeping the remaining words as keywords. For example, frequently appearing words may be less important words, such as "the," "a," "and," or other common words that may be of less importance for the user query. Take p as a keyword constant and let $E_i$ be the event that a chosen document contains keyword i. We remove all the words such that $\text{Prob}(E_i) > p$ and keep all the words that $\text{Prob}(E_i) \leq p$ as keywords. Therefore, the remaining set contains m words. Therefore, the document-keyword data is one representation of the information stored on the database.

In step 402, the system uses the document-keyword data to generate a keyword-document matrix D. The keyword-document matrix D represents the document-keyword data. The system constructs an m-by-n keyword-document matrix $\tilde{D}$, where $\tilde{D}_{ij}=1$ if keyword i appears in document j, and $\tilde{D}_{ij}=0$ if keyword i does not appear in document j. Then the normalized keyword-document matrix D is defined by:

$$D_{ij} = \frac{\tilde{D}_{ij}}{\sum_{k=1}^{m} \tilde{D}_{kj}}.$$

In step 404, the system uses the document-keyword data to generate a list of unique keywords using any suitable method. For example, to generate the list of unique keywords, the system may generate a list of all words that appear in the documents and then remove all except one occurrence of each word. In another example, for each work, the system will check if the word is already in the list. If the word is not in the list, then the system will add it to the list. If the word is in the list, then the word will not be added to the list. In this way, no duplicate occurrences of words occur in the list of unique keywords. Other methods may also be used. In step 406, the system uses the list of unique keywords to generate an adjacency matrix A. The adjacency matrix A is a data structure that represents a node diagram of the unique keywords, where each of the unique keywords is represented by a node in the diagram and edges connect words appearing in the same document, similar to the diagram 300 in FIG. 3. The adjacency matrix A is analogous to edges connecting the nodes in the previous example. In the adjacency matrix A, $A_{ij}=1$ if keyword i and keyword j appear in the same document and $A_{ij}=0$ if keyword i and keyword j fail to appear in the same document. All diagonal entries of the matrix are assumed to be 0, or $A_{ii}=0$.

In step 408, the system performs a one-step random walk to generate probability matrix P. Take c as the probability that a one-step random walk will stay at the same node, and $\delta_{ij}$ be a function such that $\delta_{ij}=1$ if i=j and $\delta_{ij}=0$ if i≠j. Then the probability matrix for the one-step random walk is:

$$P_{ij} = c\delta_{ij} + (1-c)\frac{A_{ij}}{\sum_{k=1}^{m} A_{kj}}.$$

In step 410, a two-step random walk is performed to generate $P^2$. Mathematically, this step involves computing $P^2$ from P.

In step 412, the system may generate an indexed database $P^2D$, which represents the value of each of the documents relative to each keyword. In one embodiment, the indexed database may be used to process a user query. In another embodiment matrix $P^2$ and keyword-document matrix D may be used to process a user query.

Figure 5:
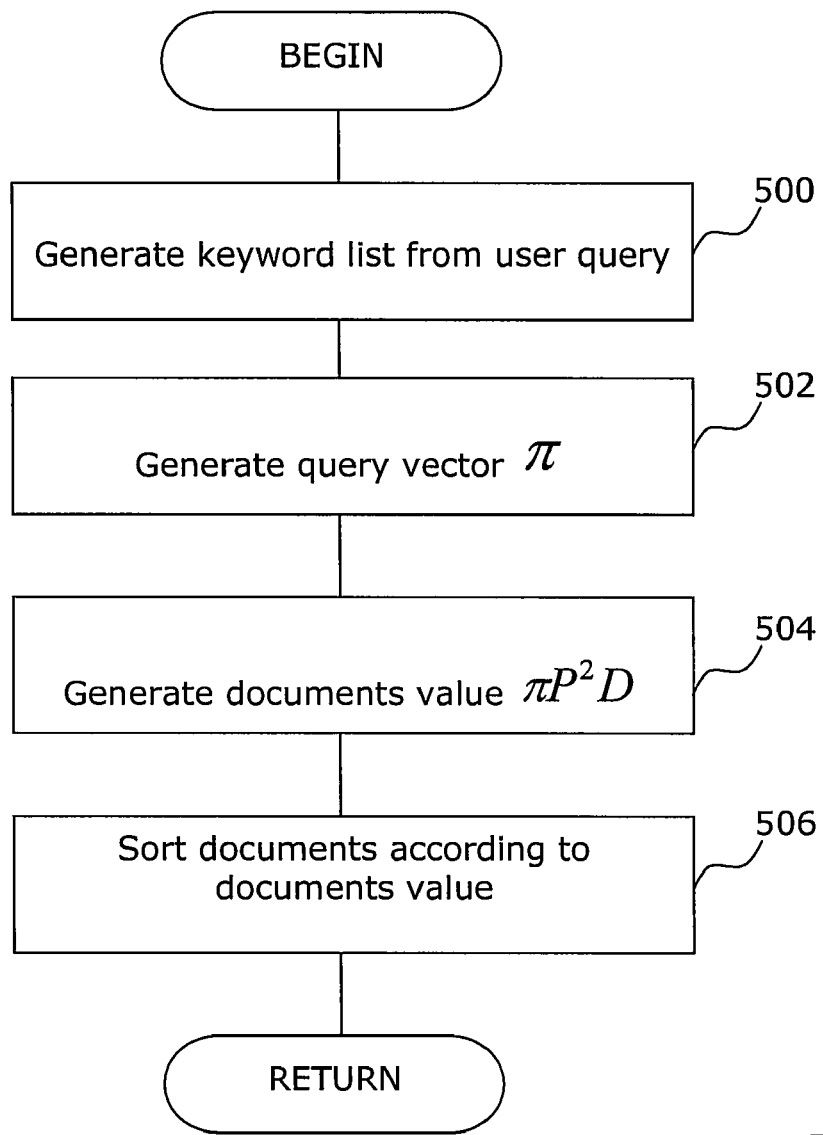
FIG. 5 is a flow diagram showing an example process of using the indexed database to generate a search result in response to a user query, in accordance with an embodiment of the present invention.

Referring now to FIG. 5, a flow diagram showing an example process of using the indexed database to generate a search result in response to a user query, in accordance with an embodiment of the present invention, is shown. According to one embodiment, the indexed database generated in accordance with the process illustrated and described with reference to FIG. 4 is used to process a user query. In step 500, in response to receiving a user query, the system generates a query keyword list by extracting all the keywords from the user query that appear in the list of unique keywords that was created from the document-keyword data. In step 502, a query vector $\pi$ is generated using the query keyword list. To generate the query vector $\pi$, a row vector $\tilde{\pi}$ is created such that $\tilde{\pi}_i=1$ if keyword i of the list of unique keywords appears in the query keyword list, and $\tilde{\pi}_i=0$ if keyword i does not appear in the query. Then the normalized query vector is:

$$\pi_i = \frac{\tilde{\pi}_i}{\sum_{k=1}^{n} \tilde{\pi}_k}.$$

In step 504, the value of each document with respect to this particular user query is generated, where a document value vector $\omega$ is given by: $\omega = \pi P^2 D$.

In step 506, the documents may then be sorted according to their values in this vector $\omega$. Then, the documents having the highest values may be retrieved as a response to the user query, and the query results may be provided to the user, which is represented by step 212 of FIG. 2.

Figure 6:
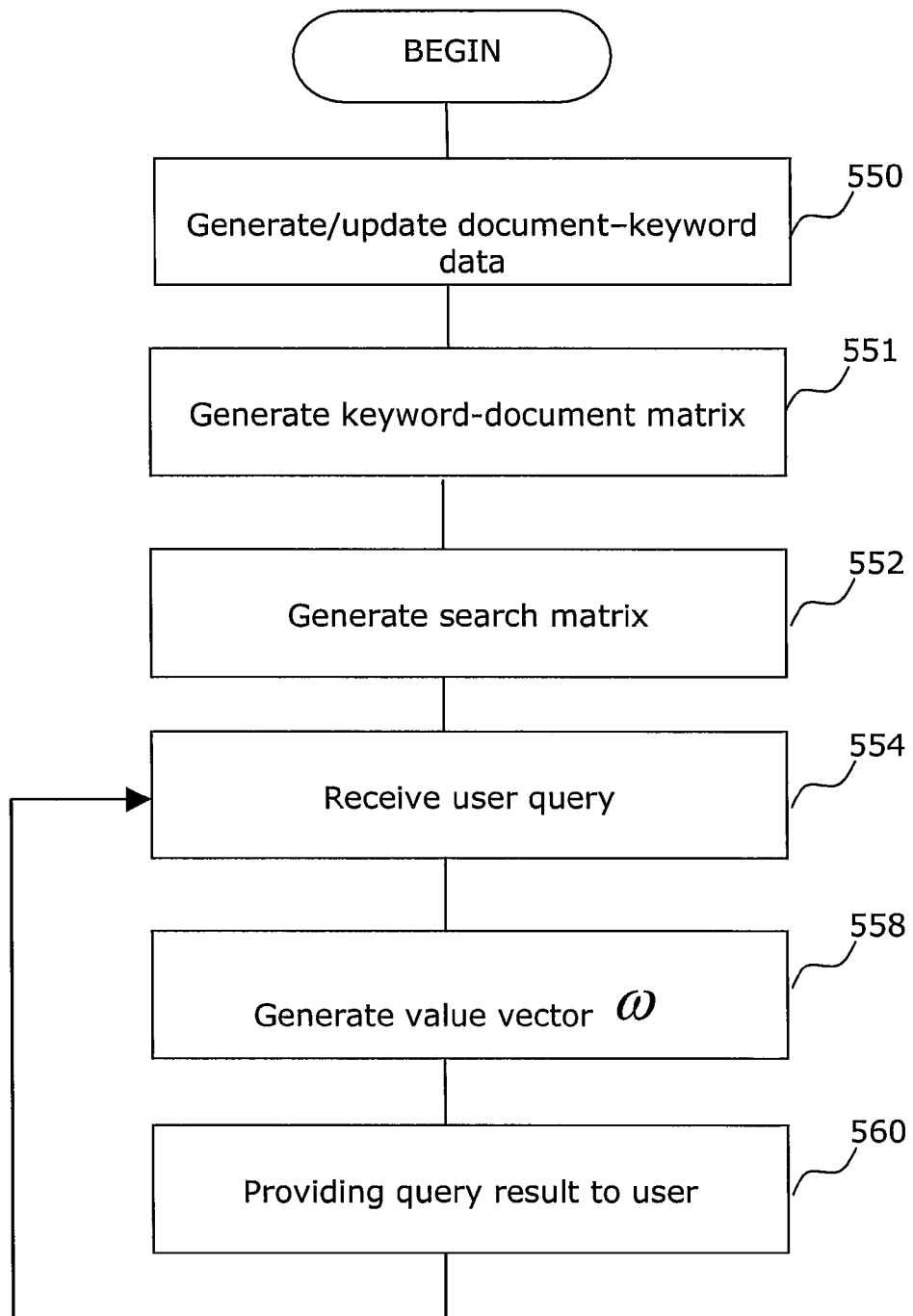
FIG. 6 is a flow diagram showing a second example process of the operation of the information retrieval system, in accordance with an embodiment of the present invention.

FIG. 6 is a flow diagram showing a second example process of the operation of the information retrieval system, in accordance with an embodiment of the present invention. According to the second example process of the operation of the system, upon receiving the user query, the value vector $\omega$ is generated using probability matrix P. According to the second example process, the adjacency matrix A, or the probability matrix P, or both the adjacency matrix A and the probability matrix P, may be stored on the system memory and periodically regenerated as the information is revised or updated. The value vector ω may then be generated dynamically using A and P. The second example process is one example of embodiments of the present invention that generate a search result in response to a user query without necessarily generating the indexed database.

Referring now to FIG. 6, in step 550, document-keyword data is generated or updated or otherwise retrieved for use by the system. In step 551, the system generates the keyword-document matrix D. In step 552, a search matrix is generated. The search matrix may be stored on the system memory. Depending on the particular implementation used, the search matrix, or search matrices, may be (i) the adjacency matrix A, (ii) the probability matrix P, or (iii) both the adjacency matrix A and the probability matrix P. In step 554, the system receives a user query. In step 558, the system generates the value vector ω, where $\omega = \pi P^2 D$. As the value vector ω is calculated using the probability matrix P, in the implementation where the adjacency matrix A is generated and stored on the system memory, the probability matrix P may also be generated dynamically using A upon receiving the user query. In step 560, the system provides a query result to the user based on the value vector ω. The system may then return to step 554 in response to additional user queries.

While the above and examples and embodiments refer generally to "documents" and "keywords," a document is one example of an object that is electronically represented as data in a computing environment. Embodiments of the present invention may similarly be applied to any type of data object existing in a computing environment. For example, embodiments of the present invention may also be used to retrieve information generally, wherein the information may comprise one or more files of any type, such as document files, data files, image files, sound files, video files, mark-up language files, executable files, compressed files, or any other file type. Accordingly, instead of generating document-keyword data, the system may generate file-term data from a collection of information. The information may be a database of one or more files having any desired type of content. Additionally, instead of a keyword-document matrix, the system may generate a term-file matrix, wherein a term may be any subpart of the particular file type; instead of a list of unique keywords, the system may generate a list of unique terms; the adjacency matrix may be a representation terms instead of keywords; the indexed database may represent the value of each of the files relative to each term; the user query and the query vector may represent terms instead of keywords; and the system may generate a file value vector, instead of a document value vector, to represent the value of each file with respect to the particular user query.

Additionally, while the illustrated and described embodiments may relate generally to a searching system by which a user query is processed, embodiments of the present invention may be implemented for any suitable purposes and applications. For example, embodiments of the invention may be used as a user suggestion system, or a targeted marketing system. According to one implementation of the user suggestion system, instead of the user query, a user may be associated with a term list, which could be generated by the user's activity history, such as purchasing history, browsing history, or user interest keywords. The query vector π may then be generated using the term list. And a database of periodically updated information may be queried using the query vector π. For example, the database could include products available in a store, news articles available for reading, books recently released, or any types of products or information, or any combination of different types of information. Therefore, embodiments of the present invention may retrieve the information that is more highly relevant to the user, based on the term list, so that the information provided to the user is tailored to the particular user's interests and habits. For example, the user suggestion system could select the top ranked products from the search result and automatically generate user-specific letters, emails, electronic messages, or other communication mediums to stimulate shopping interest. In another example, periodically, such as once a day or another predetermined time interval, a user-specific list news articles or websites can be delivered to the user. Embodiments of the invention would be able to identify products or articles that match the user's interests.

Figure 7:
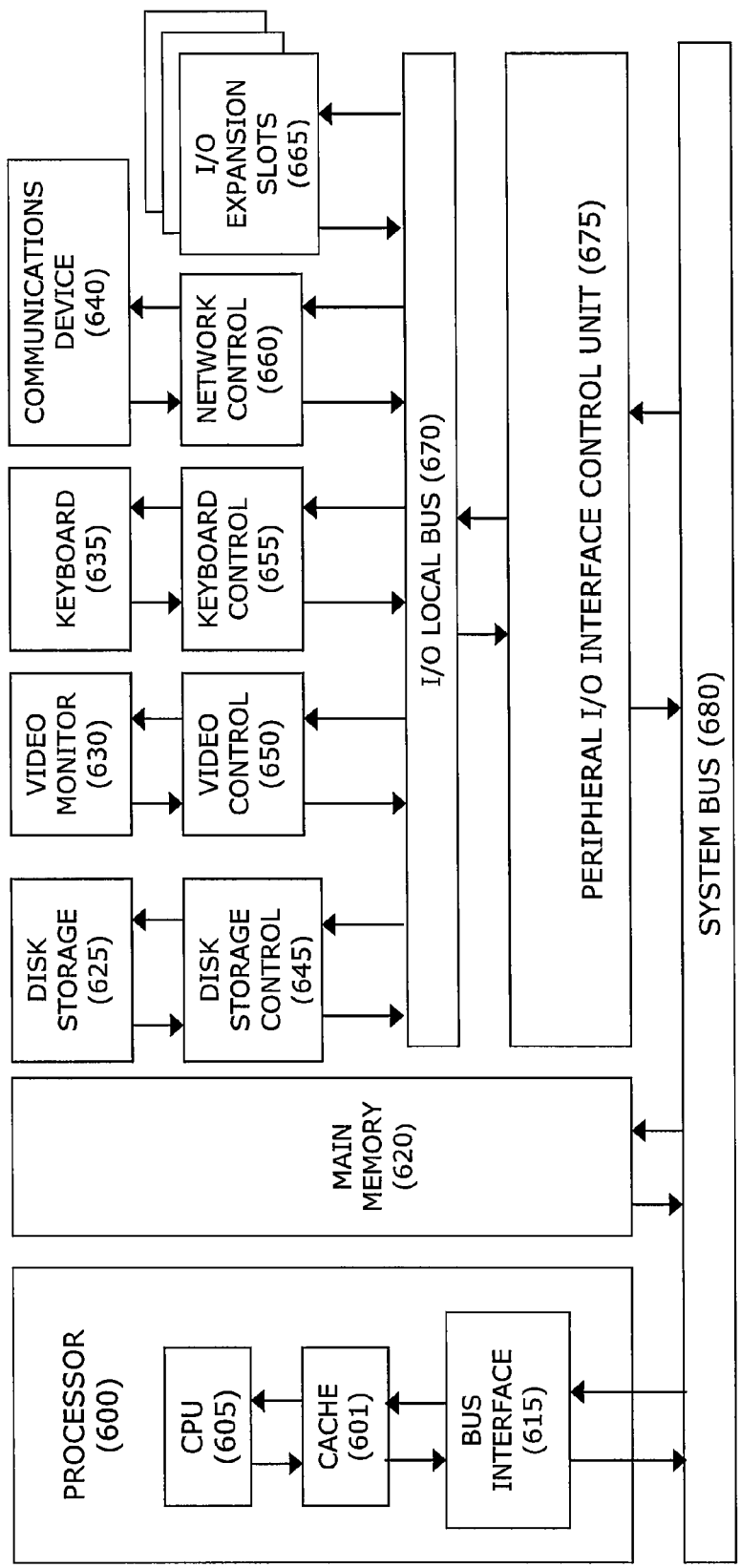
FIG. 7 is a block diagram of example computer architecture for use with embodiments of the present invention, in accordance with an embodiment of the present invention.

FIG. 7 is a block diagram of example computer architecture 600 for use with embodiments of the present invention, in accordance with an embodiment of the present invention. The illustrated example computer architecture 600 may be part of a computer suitable for performing the functions of the information retrieval system and associated applications. The illustrated computer architecture may also be suitable for running other system and network applications. A microprocessor 601, including a central processing unit (CPU) 605, a memory cache 610, and a bus interface 615, is connected via a system bus 680 to a main memory 620 and an input/output (I/O) control unit 675. The I/O interface control unit 675 is connected via an I/O local bus 670 to a disk storage controller 645, a video controller 650, a keyboard controller 655, a network controller 660, and I/O expansion slots 665. The disk storage controller 645 is connected to a disk storage device 625. The video controller is connected to a video monitor 630. The keyboard controller 655 is connected to a keyboard 635. The network controller 660 is connected to a communications device 640. The communications device 640 is adapted to allow the system or applications to communicate with a communications network, such as the Internet, a local area network (LAN), a wide area network (WAN), a virtual private network (VPN), or a middleware bus, or with other software objects over the communications network.

Computer executable program instructions for implementing the system may be stored on the disk storage device 625 until the processor 600 retrieves the computer executable instructions, either in full or in part, and stores them in the main memory 620. The processor 600 may then execute the computer program instructions stored in the main memory 620 to implement the features of the system. The executable instructions may also be executed with a multiprocessor computer having more than one processor. The various data objects generated by the system, including the matrices, vectors, the indexed database, and the search result, may be stored on either the disk storage device 625 or the memory 620 or any other storage device that is in operable communication with the system. According to one embodiment, the disk storage device 625 may be the storage module 107 illustrated in FIG. 1.

The example computer architecture illustrated in FIG. 6 is one example of architecture used to operate the system. A processor component is a device or collection of devices that is capable of operating the embodiments of the present invention. In one embodiment, the processor component may include the example computer architecture or a part of the example computer architecture, such as the microprocessor 601, that is needed to process data and the executable instructions of the information retrieval system. In one embodiment, similar example computer architecture is required for operation of the client side device, the query module, and the indexing module. The components of the system illustrated in FIG. 1 may operate on one or more computer systems. The system, and any other associated programs, applications, components, and operations, may also run on the one or more computer systems, each having a processor component. According to one embodiment, the one or more computer systems is specifically configured to perform the operations of the present invention as described with reference to the illustrated embodiments. According to another embodiment, the one or more computer systems may be a conventional computer, such as a personal computer or a dedicated server.

While the embodiments of the present invention may be implemented as computer software or computer executable instructions, the functions and operations required for implementing embodiments of the invention may also be embodied in part or in whole using hardware components, such as application specific integrated circuits or other suitable hardware, or some combination of hardware components and computer executable instructions.

Embodiments of the present invention can operate alone or in cooperation with other systems and methods. For example, embodiments of the present invention can operate as a search engine or be incorporated into another search system and method to improve the overall performance of the combined system.

While the invention has been particularly shown and described with reference to the illustrated embodiments, those skilled in the art will understand that changes in form and detail may be made without departing from the spirit and scope of the invention. For example, while the process flows are described and illustrated in a particular order, it will be appreciated that the steps and operations may be performed in other orders, as well as substantially simultaneously, for example, in the case of a large implementation where multiple users are accessing the system generally at the same time.

Accordingly, the above description is intended to provide example embodiments of the present invention, and the scope of the present invention is not to be limited by the specific examples provided.

What is claimed is:

1. An information retrieval system comprising:
a processor component configured to perform the operations of an indexing module and a storage module, the indexing module configured to generate a term list and a term-file matrix from information stored on the storage module, the information including one or more files, wherein the term-file matrix is a first data representation of the one or more files, the term-file matrix representing the appearance of terms in each of the one or more files, and wherein the term list is a data representation of one or more terms;
the indexing module further configured to generate an adjacency matrix from the one or more files, wherein the adjacency matrix is a second data representation of the one or more files, the adjacency matrix representing a relationship of the one or more terms in each of the one or more files; and wherein the adjacency matrix is represented by A, where $A_{ij}=1$ if a term i and a term j appear in the same one of the one or more files, and $A_{ij}=0$ if term i and term j fail to appear in the same one of the one or more file, and $A_{ii}=0$; and where the probability matrix P is computed by:

$$P_{ij} = c\delta_{ij} + (1-c)\frac{A_{ij}}{\sum_{k=1}^{m} A_{kj}}; \text{ and}$$

the indexing module further configured to generate a probability matrix using the adjacency matrix and a random walk, wherein the probability matrix is a data structure representing a value of each one of the one or more terms relative to the remainder of the one or more terms.

2. The information retrieval system of claim 1, wherein the indexing module is further configured to generate an indexed database using the term-file matrix and the probability matrix.

3. The information retrieval system of claim 2, wherein the term-file matrix is represented as D, the probability matrix is represented as P, and the indexed database that represents the value of each of the one or more files relative to each of the terms is generated by computing $P^2D$.

4. The information retrieval system of claim 1, the indexing module further configured to generate file data from the one or more files by parsing the one or more files, wherein the term-file matrix and the adjacency matrix are generated using the term data.

5. The information retrieval system of claim 4, wherein the parsing of the one or more files includes removing terms from the file data that appear in the one or more files with a frequency greater than a predetermined value.

6. An information retrieval system comprising:
a processor component configured to perform the operations of an indexing module and a storage module, the indexing module configured to generate a term list and a term-file matrix from information stored on the storage module, the information including one or more files, wherein the term-file matrix is a first data representation of the one or more files, the term-file matrix representing the appearance of terms in each of the one or more files, and wherein the term list is a data representation of one or more terms;
the indexing module further configured to generate an adjacency matrix from the one or more files, wherein the adjacency matrix is a second data representation of the one or more files, the adjacency matrix representing a relationship of the one or more terms in each of the one or more files;
the indexing module further configured to generate a probability matrix using the adjacency matrix and a random walk, wherein the probability matrix is a data structure representing a value of each one of the one or more terms relative to the remainder of the one or more terms; and
further comprising a query module configured to receive a user query; the query module further configured to generate a query vector based on the user query, wherein the query vector is a data representation of the user query based on terms in the user query; and wherein the query module is further configured to provide a query result to the user based on a value vector, wherein the processor component is further configured to generate the value vector using the term-file matrix, the adjacency matrix, and the probability matrix, wherein the value vector represents the value of each of the one or more files relative to the user query.

7. The information retrieval system of claim 6, wherein the term-file matrix is represented as D, the probability matrix is represented as P, and an indexed database that represents the value of each of the one or more files relative to each of the one or more terms is generated by computing $P^2D$, and the query vector is represented as π; and wherein the file value vector ω is generated by computing πP²D.

8. An information retrieval method comprising of:

generating a term list and a term-file matrix from information stored on a storage module, the information including one or more files, wherein the term-file matrix is a first data representation of the one or more files, the term-file matrix representing the appearance of terms in each of the one or more files, and wherein the term list is a data representation of one or more terms;

generating an adjacency matrix from the one or more files, wherein the adjacency matrix is a second data representation of the one or more files, the adjacency matrix representing a relationship of the one or more terms in each of the one or more files, wherein the adjacency matrix is represented by A, where $A_{ij}=1$ if a term i and a term j appear in the same one of the one or more files, and $A_{ij}=0$ if term i and term j fail to appear in the one of the one or more file, and $A_{ii}=0$; and where the probability matrix P is computed by:

$$P_{ij} = c\delta_{ij} + (1-c)\frac{A_{ij}}{\sum_{k=1}^{m} A_{kj}}; \text{ and}$$

generating a probability matrix using the adjacency matrix and a random walk, wherein the probability matrix is a data structure representing a value of each one of the one or more terms relative to the remainder of the one or more terms.

9. The method of claim 8, wherein the indexing module is further configured to generate an indexed database using the term-file matrix and the probability matrix.

10. The method of claim 8, further comprising generating file data from the one or more files by parsing the one or more files, wherein the term-file matrix and the adjacency matrix are generated using the term data.

11. The method of claim 10, wherein the parsing of the one or more files includes removing terms from the file data that appear in the one or more files with a frequency greater than a predetermined value.

12. The method of claim 8, wherein the term-file matrix is represented as D, the probability matrix is represented as P, and an indexed database that represents the value of each of the one or more files relative to each of the one or more terms is generated by computing P²D.

13. An information retrieval method comprising of:

generating a term list and a term-file matrix from information stored on a storage module, the information including one or more files, wherein the term-file matrix is a first data representation of the one or more files, the term-file matrix representing the appearance of terms in each of the one or more files, and wherein the term list is a data representation of one or more terms;

generating an adjacency matrix from the one or more files, wherein the adjacency matrix is a second data representation of the one or more files, the adjacency matrix representing a relationship of the one or more terms in each of the one or more files;

generating a probability matrix using the adjacency matrix and a random walk, wherein the probability matrix is a data structure representing a value of each one of the one or more terms relative to the remainder of the one or more terms;

receiving a user query;

generating a query vector based on the user query, wherein the query vector is a data representation of the user query based on terms in the user query; and generating a value vector using the term-file matrix, the adjacency matrix, and the probability matrix, wherein the value vector represents the value of each of the one or more files relative to the user query; and providing a query result to the user based on the file value vector.

14. The method of claim 13, wherein the term-file matrix is represented as D, the probability matrix is represented as P, and an indexed database that represents the value of each of the one or more files relative to each of the one or more terms is generated by computing P²D; and wherein the query vector is represented as π, and the value vector ω is generated by computing πP²D.

15. A computer-readable memory medium having computer-executable instructions for controlling a computer processor to retrieve information, comprising:

instructions for generating a term list and a term-file matrix from information stored on a storage module, the information including one or more files, wherein the term-file matrix is a first data representation of the one or more files, the term-file matrix representing the appearance of terms in each of the one or more files, and wherein the term list is a data representation of one or more terms;

instructions for generating an adjacency matrix from the one or more files, wherein the adjacency matrix is a second data representation of the one or more files, the adjacency matrix representing a relationship of the one or more terms in each of the one or more files, wherein the adjacency matrix is represented by A, where $A_{ij}=1$ if a term i and a term j appear in the same one of the one or more files, and $A_{ij}=0$ if term i and term j fail to appear in the one of the one or more file, and $A_{ii}=0$; and where the probability matrix P is computed by:

$$P_{ij} = c\delta_{ij} + (1-c)\frac{A_{ij}}{\sum_{k=1}^{m} A_{kj}}; \text{ and}$$

instructions for generating a probability matrix using the adjacency matrix and a random walk, wherein the probability matrix is a data structure representing a value of each one of the one or more terms relative to the remainder of the one or more terms.

16. The computer-readable memory medium of claim 15, further comprising instructions for generating an indexed database using the term-file matrix and the probability matrix.

17. The computer-readable memory medium of claim 15, further comprising instructions for generating file data from the one or more files by parsing the one or more files, wherein the term-file matrix and the adjacency matrix are generated using the term data.

18. The computer-readable memory medium of claim 17, wherein the parsing of the one or more files includes removing terms from the file data that appear in the one or more files with a frequency greater than a predetermined value.

19. The computer-readable memory medium of claim 15, wherein the term-file matrix is represented as D, the probability matrix is represented as P, and an indexed database that represents the value of each of the one or more files relative each of the terms is generated by computing P²D.

20. A computer-readable memory medium having computer-executable instructions for controlling a computer processor to retrieve information, comprising:
- instructions for generating a term list and a term-file matrix from information stored on a storage module, the information including one or more files, wherein the term-file matrix is a first data representation of the one or more files, the term-file matrix representing the appearance of terms in each of the one or more files, and wherein the term list is a data representation of one or more terms;
- instructions for generating an adjacency matrix from the one or more files, wherein the adjacency matrix is a second data representation of the one or more files, the adjacency matrix representing a relationship of the one or more terms in each of the one or more files; and
- instructions for generating a probability matrix using the adjacency matrix and a random walk, wherein the probability matrix is a data structure representing a value of each one of the one or more terms relative to the remainder of the one or more terms;
- instructions for receiving a user query;
- instructions for generating a query vector based on the user query, wherein the query vector is a data representation of the user query based on terms in the user query; and
- instructions for generating a value vector using the term-file matrix, the adjacency matrix, and the probability matrix, wherein the value vector represents the value of each of the one or more files relative to the user query; and
- instructions for providing a query result to the user based on the value vector.

21. The computer-readable memory medium of claim 20, wherein the term-file matrix is represented as D, the probability matrix is represented as P, and an indexed database that represents the value of each of the one or more files relative each of the terms is generated by computing $P^2D$; and wherein the query vector is represented as $\pi$, and the value vector is generated by computing $\pi P^2 D$.

* * * * *